April 22, 1941.   C. H. NORTON   2,238,982
BED FOR DOGS OR THE LIKE
Filed April 15, 1939   2 Sheets-Sheet 2

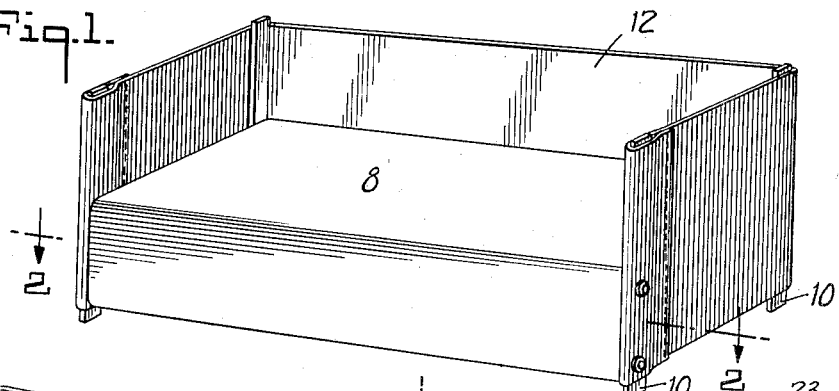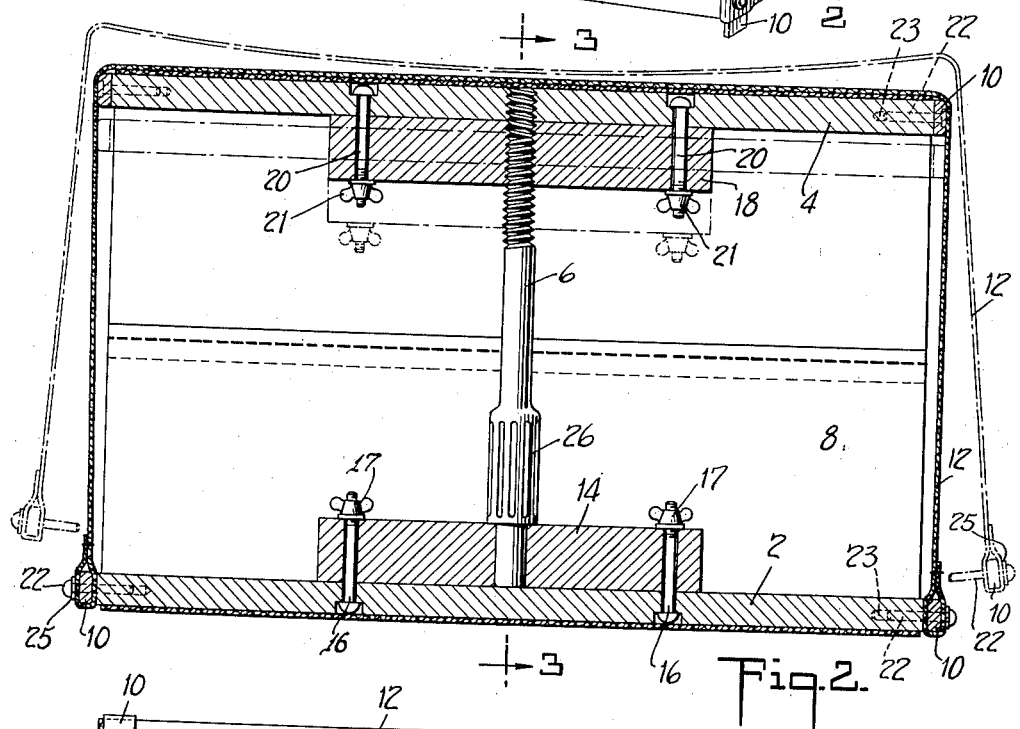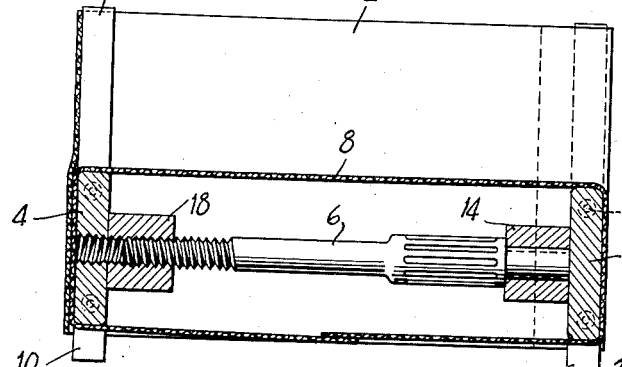

INVENTOR
Chester H. Norton
BY
Bartlett, Eyre, Scott & Keel
ATTORNEYS

Patented Apr. 22, 1941

2,238,982

UNITED STATES PATENT OFFICE 2,238,982

BED FOR DOGS OR THE LIKE

Chester H. Norton, Bronxville, N. Y.

Application April 15, 1939, Serial No. 268,092

9 Claims. (Cl. 119—1)

My present invention relates to beds for animal pets and comprises a novel device which is particularly suited to its purpose, may be readily assembled and disassembled and is economical to manufacture. The new bed, while intended primarily as a dog bed, has novel features of construction which can be advantageously employed in the manufacture of day beds, cribs, baby carriages, beach cots or the like as will be apparent as the description proceeds.

Basket dog beds, the type now most commonly used, are drafty and hard to keep clean. They take up an undue amount of display space in the stores and a great deal of room when travelling. They are also relatively expensive. The bed of the present invention has none of these disadvantages. It may be readily collapsed, without the use of tools, for storage on dealers' shelves or for travelling. It is easily washed, is not drafty and is inexpensive to manufacture. Above all it has been found in actual practice to be particularly attractive to animals.

For an understanding of the invention reference may be had to the accompanying drawings of which:

Figure 1 is a perspective view of an assembled bed embodying the invention;

Fig. 2 is an enlarged horizontal sectional view along the line 2—2 of Fig. 1;

Fig. 3 is a vertical sectional view along the line 3—3 of Fig. 2;

Figure 4:
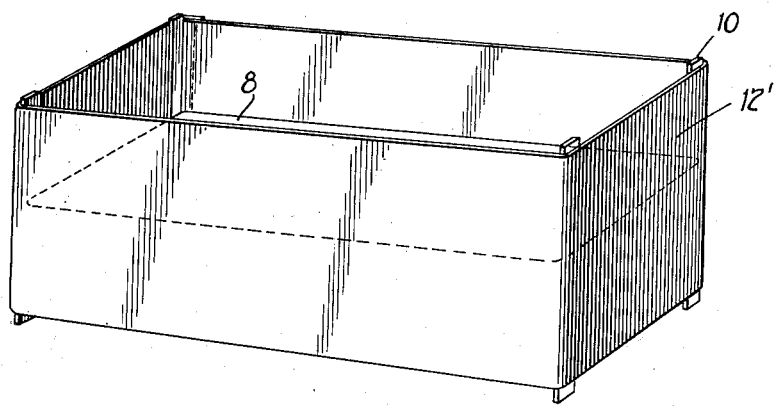
Fig. 4 is a perspective view illustrating a modification.

As shown in the drawings, the essential parts of the new bed comprise front and rear members 2 and 4, a member 6, connecting the members 2 and 4 and a loop 8 of canvas or the like encircling and enclosing the members 2, 4 and 6. The bed includes also uprights 10, which serve as legs for the bed and which in the embodiment illustrated in Figs. 1 to 3, form a framework for a strip 12 of canvas or the like forming protecting side and rear walls of the device.

Members 2 and 4 are preferably of wood as are the member 6 and uprights 10. Member 2 has a block 14 secured to its central inner surface by means of bolts 16 and wing nuts 17. Block 14 is provided with a central bored hole for reception of one end of member 6. Member 6 is threaded at its other end for substantially one third of its length. Member 4 has a block 18 secured to its inner surface by means of bolts 20 and wing nuts 21. Blocks 14 and 18 serve as reinforcements of members 2 and 4 to prevent bowing thereof when under tension. Block 18 and member 4 have aligned internally threaded holes for reception of the threaded end of the member 6.

The uprights 10 are each provided with a pair of apertures for reception of studs or rivets 22 and each end of each of members 2 and 4 is provided with a pair of drilled recesses 23 likewise for reception of the studs 22. The strip 12 is hemmed at each end and a pair of holes is provided in each hem which, when the device is assembled, aline with the apertures in the uprights 10 and the recesses 23 in the ends of member 2.

In assembling the device the threaded end of member 6 is first screwed into the threaded hole in block 18 until it is substantially beyond the outer surface of member 4. The smooth end of the member 6 is then inserted into the hole in block 14. Members 2 and 4 will then be relatively close together as indicated by the dotted line position of member 4 in Fig. 2. The loop of canvas 8 may thus be readily slipped around the front and back members. If the bed is to have the side and back walls, an upright 10 is secured directly to each end of member 4 by means of the studs 22. As each recess 23 is slightly oversize, the studs are readily inserted with but slight pressure. The other two uprights are then inserted in the hems of strip 12 and secured to member 2 by means of studs 22. In Fig. 2, the strip 12 just prior to attachment to member 2 is indicated in dotted lines. Preferably washers 25 are inserted between the heads of the studs and the hems of the strip 12. With the bed thus assembled, it is only necessary to reach within the loop 8 and unscrew the member 6 until all parts of the bed are taut and the parts are in the full line position of Fig. 2. This unscrewing of the member not only tightens the loop 8 into a drum strong enough to hold the animal without appreciable sag but also makes the strip 12 taut and prevents removal thereof because of the side pull upon the studs 22. For convenience in manipulating the member, it is preferably provided with an enlarged gripping portion 26 which may be integral with the member or fixedly secured thereto.

As shown best in Fig. 2, the gripping portion 26 is preferably located adjacent the front end of the member and has a vertical surface which engages the inner surface of block 14 when the bed is assembled. This arrangement tends to maintain the members 2 and 4 parallel, that is, it prevents wobbling of the front and back members about the member 6.

Both the canvas and framework portions of the above described bed may be sprayed with cedar oil or other vermin preventative as desired. Washing of the bed is particularly easy. If desired it may be disassembled and the parts washed separately, but preferably the exposed surface of the loop 8 is washed in situ as being under tension it will dry most rapidly. To prevent stretching of the canvas it is advisable to loosen the bed slightly by means of the member 6 while the canvas is drying. Stretching or shrinking, however, can readily be compensated for by adjustment of the member 6. If the surface of the bed becomes soiled and it is not convenient to wash it immediately, a fresh surface can be quickly obtained by slightly screwing up the member 6 and then sliding the loop 8 around to substitute the lower for the upper stretch.

In Fig. 4 is shown a bed similar to that of Figs. 1 to 3 but having protecting walls on all sides thereof. In this arrangement, the walls are formed from a strip 12' sewed together at its ends to form a loop which is slid over the uprights 10 while the bed is slightly collapsed. This type of bed is of particular value for whelping and also for the young puppies. The protecting wall prevents the puppies from falling from the bed and the surface of the bed, like that of Figs. 1 to 3 will dry rapidly. In the summer time the air chamber beneath the upper reach of loop 8 keeps the mother and puppies cool and comfortable and yet out of all drafts.

Figure 5:
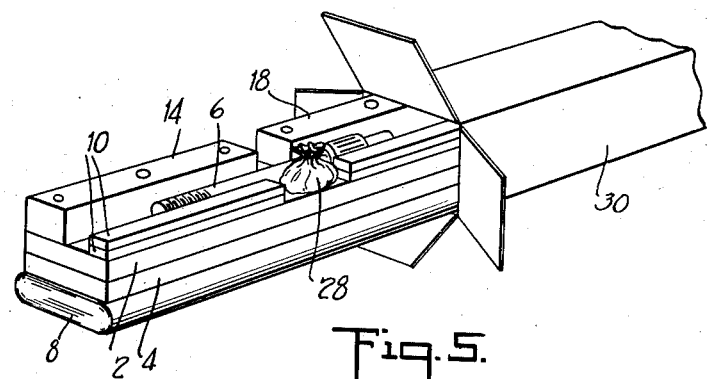
Fig. 5 is a view illustrating the bed of Fig. 1 when disassembled and the parts ready for packing into a container.

As an indication of the relatively small and compact space into which a disassembled bed may be packed, reference may be had to Fig. 5. In this figure, the blocks 14 and 18 are shown detached from the members 2 and 4 respectively and the bolts, nuts, studs and washers are packed in a small bag 28. The bed so disassembled can be packed into a small container or carton 30 for storage or shipping or for transportation in an automobile luggage compartment.

If it is desired in traveling to carry the new bed in assembled condition with one or more dogs or puppies therein the bed construction is such that a suitably handled cover could be slipped over the bed and secured, for example, to the depending portions of uprights 10.

From the above description it will be apparent that the invention provides a comfortable, sanitary and relatively inexpensive bed for animals that may be readily disassembled for traveling or for storage or carried while assembled and that is attractive in appearance. The bed may be made in different sizes and can be used with or without any side wall. For warm weather the uprights 10 and strips 12 or 12' may be removed and the drum comprising the cross member 6, front and back members and canvas loop can be used alone, as the upper surface of the loop is sufficiently above the floor level without the uprights 10.

The following is claimed:

1. A bed for animals comprising in combination front and back members, a spacing member detachably engaging said front and back members, a loop of flexible material encircling said members and holding the same together in the form of a framework, upright members secured to the ends of said front and back members and a wall member of flexible material enclosing said uprights.

2. An animal bed according to claim 1 wherein said strip of flexible material encloses said uprights to provide side and back walls for the bed.

3. A device of the type described comprising in combination a member provided with a recess on the inner side thereof, a second member provided with a threaded hole, a transverse member having one end threaded to fit the threaded hole of said second member and its other end shaped for insertion into the recess of said first member, and a flexible loop encircling all of said members, the length of said loop and the dimension of said members being so proportioned that the loop may be slipped over said members when the front and back members are brought toward each other by turning of said connecting member and may be made taut by turning said connecting member in the opposite direction.

4. A dog bed comprising a front wooden member having a recess on the inner surface thereof, a rear wooden member having an internally threaded hole therethrough, a cross member having one end threaded for screwing into said hole and its other end insertable into said recess, and a flexible loop surrounding said front, rear and cross members and of a length to be made loose when said cross member is screwed a given distance into said hole and to be made taut when said cross member is screwed a lesser distance into said hole.

5. A bed according to claim 4 including an upright member secured to each end of each of said front and rear members and extending both above and below the same, and a strip of flexible material secured about said upright members to provide side walls for said bed.

6. A bed for animal pets comprising a framework, a loop of flexible material surrounding said framework, uprights secured to each corner of said framework, and a strip of flexible material secured about said uprights to provide protecting walls, said framework including means whereby the tension of said loop and said walls may be manually adjusted by a single operation.

7. A bed according to claim 6 wherein said last mentioned means comprises a threaded cross member extending from the front to the back of the bed and adapted when turned in one direction to tighten said loop and stretch said strip, and when turned in the other direction to loosen said loop and strip.

8. A bed according to claim 6 wherein said strip is a loop and extends around all four sides of said framework.

9. A bed for young animals comprising in combination a yieldable horizontal surface portion, a framework beneath said horizontal portion, upright members secured to said framework, and a vertical wall portion surrounding said horizontal surface and said upright members, said framework including means beneath said horizontal surface for adjusting the tension of said horizontal and wall portions.

CHESTER H. NORTON.